US008527631B1

(12) United States Patent
Liang (10) Patent No.: US 8,527,631 B1
(45) Date of Patent: Sep. 3, 2013

(54) WEB SITE REPUTATION SERVICE USING PROXY AUTO-CONFIGURATION

(75) Inventor: Han-Chang Liang, Taipei (TW)

(73) Assignee: Trend Micro, Inc., Tokyo (JP)

( * ) Notice: Subject to any disclaimer, the term of this patent is extended or adjusted under 35 U.S.C. 154(b) by 509 days.

(21) Appl. No.: 12/146,899

(22) Filed: Jun. 26, 2008

(51) Int. Cl.
G06F 15/173 (2006.01)
G06F 9/00 (2006.01)

(52) U.S. Cl.
USPC ............................................. 709/225; 726/12

(58) Field of Classification Search
USPC ................. 709/223–226, 238–244; 726/2–22
See application file for complete search history.

(56) References Cited

U.S. PATENT DOCUMENTS

| 7,921,226 B2 * | 4/2011 | Mukherjee et al. ........... 709/238 |
| 2004/0249911 A1 * | 12/2004 | Alkhatib et al. .............. 709/223 |
| 2006/0143703 A1 * | 6/2006 | Hopen et al. .................... 726/15 |
| 2007/0297396 A1 * | 12/2007 | Eldar et al. ..................... 370/356 |
| 2008/0082662 A1 * | 4/2008 | Dandliker et al. ............ 709/225 |

* cited by examiner

Primary Examiner — Afshawn Towfighi
(74) Attorney, Agent, or Firm — Beyer Law Group LLP

(57) ABSTRACT

A Web site reputation service automatically redirects a browsing request for analysis by a rating server. On the browsing request, a proxy autoconfiguration (PAC) file is downloaded from a PAC server to a Web browser of a user computer. The function of the PAC file is executed, sending a request to a rating server along with a host name of a target Web site. The function does not immediately return a proxy server, but first requests a rating of the Web site. A rating result associated with the Web site is produced by the rating server. The rating server returns the rating result and the function returns an address of a proxy server to the Web browser based upon the rating result. A user can enable the Web Proxy Autodiscovery Protocol to use the service. Access control may be implemented by applying an HTTP authentication mechanism on the Web server that hosts the PAC file.

32 Claims, 7 Drawing Sheets

Web Site Reputation System

Simple PAC File

```
function FindProxyForURL(url, host)
{
   var QueryString = host.concat(".wrs.trend.com");      504
   var RatingResult = dnsResolve(QueryString);      508
   if (RatingResult == "0.0.0.1")
      return "PROXY AccessDenied.trend.com:3128"      512
   else if (RatingResult == "0.0.0.0")
      return "DIRECT"      516
}
```
500

*FIG. 6*

```
function FindProxyForURL(url, host)
{
   var QueryString = host.concat(".wrs.trend.com");
   var RatingResult = dnsResolve(QueryString);      524
   if (isInNet(RatingResult, "0.0.0.3" , "255.255.255.1"))
      return "PROXY AccessDenied.trend.com:3128"
   else
      return "DIRECT"
}
```
520

*FIG. 7*

```
function FindProxyForURL(url, host)
{
   var QueryString = host.concat(".wrs.trend.com");
   var RatingResult = dnsResolve(QueryString);      544
   if (isInNet(RatingResult, "0.0.0.3" , "255.255.255.2"))
      return "PROXY AccessDenied.trend.com:3128"
   else
      return "DIRECT"
}
```
540

*FIG. 8*

```
function FindProxyForURL(url, host)
{
  var QueryString = host.concat(".wrs.trend.com");
  var RatingResult = dnsResolve(QueryString);
  if (RatingResult == "0.0.0.1")
    return "PROXY AccessDenied.trend.com:3128"    ~ 564
  else if (RatingResult == "0.0.0.0")
    return "PROXY proxy.aol.com:3128"   ~ 568
}
```
560

FIG. 9

```
function FindProxyForURL(url, host)
{
  var EncodedURL = escape(url);
  EncodedURL = EncodedURL.replace("%","__");
  EncodedURL = EncodedURL.replace("+", "___");
  EncodedURL = EncodedURL.replace("-", "____");
  EncodedURL = EncodedURL.replace("*", "_____");
  EncodedURL = EncodedURL.replace("/", "______");
  EncodedURL = EncodedURL.replace("@", "_______");
  var QueryString = EncodedURL.concat(".wrs.trend.com");
  var RatingResult = dnsResolve(QueryString);
  if (RatingResult, "0.0.0.1")
    return "PROXY AccessDenied.trend.com:3128"
  else if (RatingResult == "0.0.0.0")
    return "DIRECT"
}
```
580

WEB SITE REPUTATION SERVICE USING PROXY AUTO-CONFIGURATION

FIELD OF THE INVENTION

The present invention relates generally to prevention of malicious software when using the Internet. More specifically, the present invention relates to using a configuration file to access a Web site reputation service.

BACKGROUND OF THE INVENTION

When accessing the World Wide Web over the Internet a computer user must be careful not to access, use or download files from a Web site of unknown reputation. Unfortunately, disreputable operators of certain Web sites can implement the Web site such that an unknowing user might download a computer virus, spyware, or other type of malware simply by accessing or using that Web site. For example, it is generally known that downloading free software or games from a variety of Web sites is risky in that spyware and other types of malicious software might be downloaded as well onto the user computer. Further, a disreputable Web site might be involved in a phishing or pharming scam and attempt to steal information from a user even without the user trying to download malicious software onto the user computer. In addition, it may be desirable on the part of a company, organization or even a parent to restrict access to certain Web sites simply because of the content.

As such, it is known in the art that a variety of filtering technologies are used to block a computer user from accessing certain disreputable or undesirable Web sites. For example, network traffic filtering is used to block traffic to particular Web sites. In this technology, a kernel driver or a layered service provider (LSP) is first installed on the user computer. This installed software filters network traffic and blocks such network traffic specific to a particular Web site when the software determines that the user is attempting to browse to a Web site that is considered dangerous.

Unfortunately, this technique has some disadvantages. Firstly, the user must install the network traffic filtering software on their computer and must update the software periodically. Secondly, both the kernel driver-based approach and the LSP-based approach cannot handle Web site browsing requests using the secure HTTP protocol. Thirdly, both approaches have trouble filtering all Web site browsing requests because both approaches cannot clearly identify whether a packet begins an HTTP protocol transition or not—there is no information in a packet that can guarantee that it belongs to an HTTP protocol transition. These approaches can only make an educated guess based on common practices. For example, a packet might belong to an HTTP protocol transition if its target port of TCP protocol is one of the well-known HTTP service ports or if its payload matches with the pattern of an HTTP protocol. This uncertainty, though, can cause false positives.

Another filtering technology used involves Web browser plug-in software. A user installs special plug-in software in their browser and the software filters all Web browsing requests sent by the browser and blocks specific requests when the requested Web site is considered disreputable or dangerous. Similar to the first technique, one disadvantage is that the user must install and then maintain the special plug-in software. Further, a provider of this technology must implement multiple versions of the browser plug-in software in order to adapt to different Web browsers. Currently there is no standard for a browser plug-in.

A third filtering technology is proxy-based filtering. A user must first configure his or her Web browser in order to route the browsing request via a specific proxy server. Or, the Internet service provider sets up a transparent proxy server to handle the Web site browsing requests from the user. From that point on, the proxy server will intercept and review all Web site browsing requests from the user and then block specific requests when the target Web site is considered dangerous. One disadvantage of this technique is that if a target Web site is considered safe, the proxy server must fetch data from the target Web site and then redirect that data to the user. This approach requires very careful hardware and software design in order to achieve acceptable throughput. Also, this data redirection has an enormous cost in terms of network traffic. If the proxy server is hosted centrally in a particular company, bandwidth and scalability issues can be major challenges.

Considering these previous approaches and their disadvantages, a Web site reputation service is desired that would be simple, flexible and easy for the end user to use.

SUMMARY OF THE INVENTION

To achieve the foregoing, and in accordance with the purpose of the present invention, a Web site reputation service is disclosed that automatically redirects a browsing request for analysis by a rating server.

In one embodiment, a Web site is rated by first downloading a proxy autoconfiguration (PAC) file from a PAC server to a Web browser of a user computer. The function of the PAC file is executed, including sending a request to a rating server along with a host name of a target Web site that the user wishes to browse. Unlike the prior art, the function does not immediately return a proxy server, but first requests a rating of the Web site. Next, a rating result associated with the Web site is produced by the rating server. The rating server returns the rating result to the function in the PAC file, and then the function returns an address of a proxy server to the Web browser based upon the rating result from the rating server.

In another embodiment, a Web site reputation system is disclosed. The present invention thus provides a Web site reputation service using the proxy auto-configuration mechanism that is commonly supported by many Web browsers. The invention protects users when they browse Web sites without the need to install any extra anti-virus or anti-spyware software. A user may also easily use the Web site reputation service by enabling the commonly supported Web Proxy Autodiscovery Protocol in his or her Web browser.

Other advantages are that the present invention can handle the secure HTTP protocol, can handle other protocols supported by a Web browser such as FTP, and can handle HTTP protocol transitions to any target port whether or not the target port belongs to a well-known HTTP port or not. Further, a single PAC file is compatible with most all popular Web browsers. Also, access control for this service may be implemented by applying an HTTP authentication mechanism on the Web server that hosts the PAC file.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

It is known in the art that a software browser running on a computer typically accesses a proxy server in order to fetch a Web page for a given URL. A browser uses a proxy server (instead of contacting the World Wide Web directly) because most ISPs provide proxy servers to their users and suggest that the users make use of them. Use of a proxy server reduces duplication of data fetching. Use of a proxy server is an ideal situation, though. Practically speaking, many users do not follow the suggestion of their ISP and thus do not set a proxy server, resulting in access to the World Wide Web directly. The present invention is suitable in both situations.

Currently, most Web browsers provide both manual and automatic methods for determining a proxy server to be used (or if one should be used). Manual proxy selection involves specifying in the browser a host name and a port number for the desired proxy server. This proxy server will then be used to fetch Web pages for all URLs entered into the browser. Some browsers allow the user to specify a list of domains that will bypass this designated proxy server.

Two automatic methods exist. The first, proxy automatic configuration or proxy auto-configuration (PAC), involves specifying a URL for a special PAC file that will determine the appropriate proxy server for each target URL desired by the user. This method is generally suitable for laptop users needing different proxy configurations, or for complex corporate arrangements using many different proxy servers. Using this method, the PAC file defines how a Web browser and other software agents can automatically choose the appropriate proxy server. Use of a PAC file is commonly supported by popular Web browsers such as Internet Explorer, Mozilla Firefox, Apple Safari, etc. Typically, the PAC file contains a JavaScript function (or any script file) that returns an access method to the browser, thus requiring the browser to use a particular proxy server or to connect directly to the World Wide Web.

Unlike the first automatic method in which a setting in the browser specifies the exact URL to find the PAC file, the second automatic method allows the browser to automatically discover the location of the PAC file; this second method is termed Web Proxy Autodiscovery Protocol (WPAD). Using this technique, the browser determines the URL of the PAC file by using either a DNS-based or DHCP-based lookup. In either case, the browser is provided with the URL of the PAC file just as in the first automatic method.

In order to use the automatic methods an entity first writes code for the PAC file, publishes the PAC file on a particular Web server, and then instructs a browser or other software agent to use that PAC file using one of the above automatic methods. Here is an example of a very simple PAC file:

Function FindProxyForURL (URL, host)
{return "PROXY proxy.companyX.com:7070; DIRECT";}

Thus, when a user's Web browser makes an HTTP request based on the target URL input by the user, the browser first accesses this PAC file (using any of the automatic methods) and then executes this function in the PAC file. The input target URL and the corresponding host name are passed as parameters to this function. In this simple example, the function instructs the browser to retrieve Web pages using port 7070 of the proxy server proxy.companyX.com. If this proxy server fails to respond, the browser is then instructed to contact the World Wide Web directly without using a proxy server. The PAC file is typically a text file that includes a script, and generally defines at least one JavaScript function. This file is typically named "proxy.pac," but is often named "wpad.dat" under the second automatic technique.

The present invention advantageously recognizes that a PAC file may be used to assist in a Web site reputation service in addition to simply returning a proxy server to a Web browser. Because a Web browser may be automatically directed to execute a function in the PAC file whenever a browsing request occurs, the present invention recognizes that all browsing requests can be filtered by customizing this function and by providing a level of indirection. Further, filtering of the target URL input by the user may be performed using currently supported utility functions and no extra software is required on the user computer.

System Diagram

Figure 1:
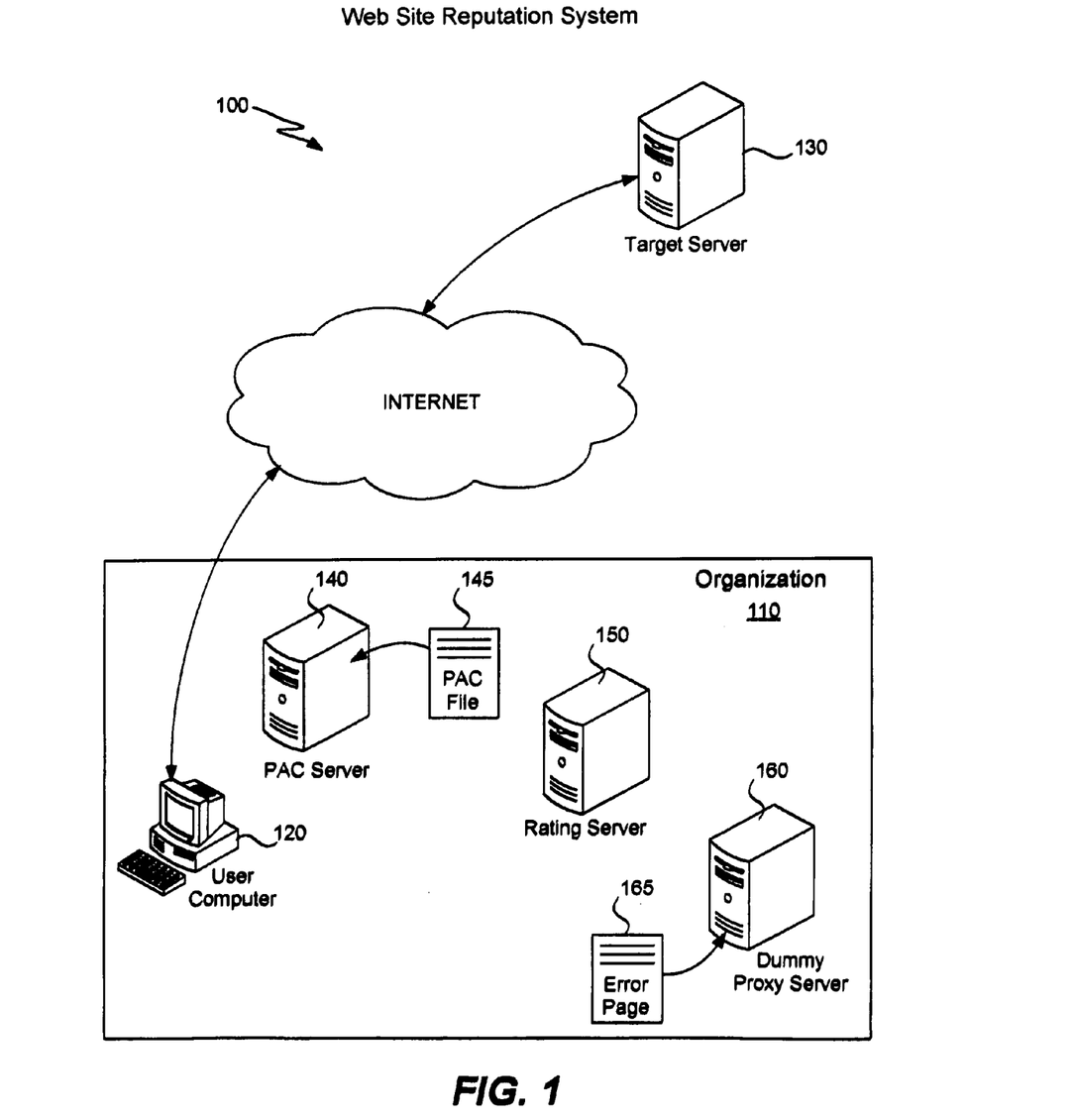
FIG. 1 is a block diagram of a Web site reputation system according to one embodiment of the invention.

FIG. 1 is a block diagram of a Web site reputation system 100 according to one embodiment of the invention. Included within system 100 is an organization 110 that exercises control over the computers and servers shown. User computer 120 is any suitable desktop, laptop, workstation or other computer that a user uses to access the Internet in order to view a Web site resident on target server 130. Computer 120 may even be a PDA, mobile telephone or smart telephone with which the user accesses the Internet using any suitable technology. Installed on user computer 120 is any suitable Web browser or other agent software used to access a Web site over the Internet. Agent software includes any software that can be configured to access the Internet via a standard HTTP proxy. For example, HTTP-based instant messaging software (e.g., Microsoft's "Live Messenger") is one example of agent software.

Target server 130 is any computer accessible over the Internet hosting a Web site that the user wishes to view. PAC server 140 is any suitable Web server computer that hosts a PAC file 145 described generally above, and more specifically below. Rating server 150 is a DNS server or a Web server arranged to field a query regarding a host name and to return the results. In one embodiment, organization 110 hosts and implements rating server 150 as a DNS server which can receive and process DNS queries of the form "*.wrs.trend.com." Rating server 150 includes software to implement a Web site reputation service as is known in the art. For example, rating server 150 includes a Web site reputation service such as that included within the Trend Micro "InterScan Gateway Security Appliance." This software appliance sits behind a customer's existing firewall or VPN, and in addition to antivirus, anti-spyware, anti-spam, content filtering, and anti-bot functionality, includes URL filtering via a reputation service. This reputation service assigns Web sites a "reputation" based on an assessment of the trustworthiness of a URL, derived from an analysis of the domain. The service protects against Web-based threats and tracks the lifecycle of hundreds of millions of Web domains.

Dummy proxy server 160 is any suitable proxy server computer that includes the ability to present an error page 165. The dummy proxy server would not typically provide normal Web proxy service, but would always respond with an error page or warning page to the user no matter the query sent to it.

Service Flow Description

As described above, the present invention recognizes that when a Web browser accesses a PAC server in order to execute the PAC file, there is an opportunity to perform an analysis of the target Web site that the browser is requesting. Briefly, when the user attempts to browse a particular Web site, he or she provides a URL including the host name and the Web browser passes this host name to the function in the PAC file. The function in the PAC file may be arranged to cause a rating of this Web site to be performed, and then redirect the Web browser to a dummy proxy server to display an alert message if the target Web site is considered dangerous. Alternatively, the Web browser can be connected to the target Web site directly when the target URL is considered safe.

Figure 2:
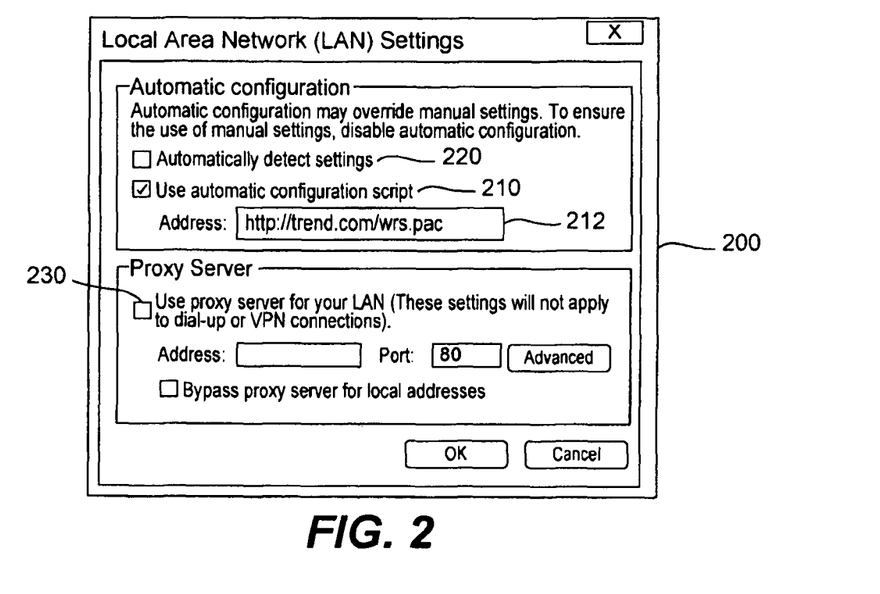
FIG. 2 illustrates a typical settings window in a Web browser that enables a user to determine how his or her computer accesses the Internet.

FIG. 2 illustrates a typical settings window 200 in a Web browser that enables a user to determine how his or her computer accesses the Internet. As shown, setting 210 is checked indicating that the Web browser will use an automatic configuration script available at the address 212 listed. In other words, the browser will use the first automatic technique described above, proxy auto-configuration, that makes use of a PAC file located at the address shown. In this example, PAC file 145 is named "wrs.pac" and PAC server 140 is located using the address 212 "http://trend.com/wrs.pac". Also shown is a setting 220 that would allow discovery of the PAC file using Web Proxy Autodiscovery Protocol, and a setting 230 that would allow for manual proxy selection. In this example, organization 110 in some fashion encourages, requires or establishes that each computer user configure their browser as shown in window 200. In general, there are two approaches to configure a browser in this way. If an office network is managed by central software (for example, Microsoft's "Active Directory Mechanism"), most browser software can be configured by the "group policy" mechanism (since all files, registry keys/values can be modified by it). Or, an organization can prevent any Internet access unless a proxy server is used.

Figure 3:
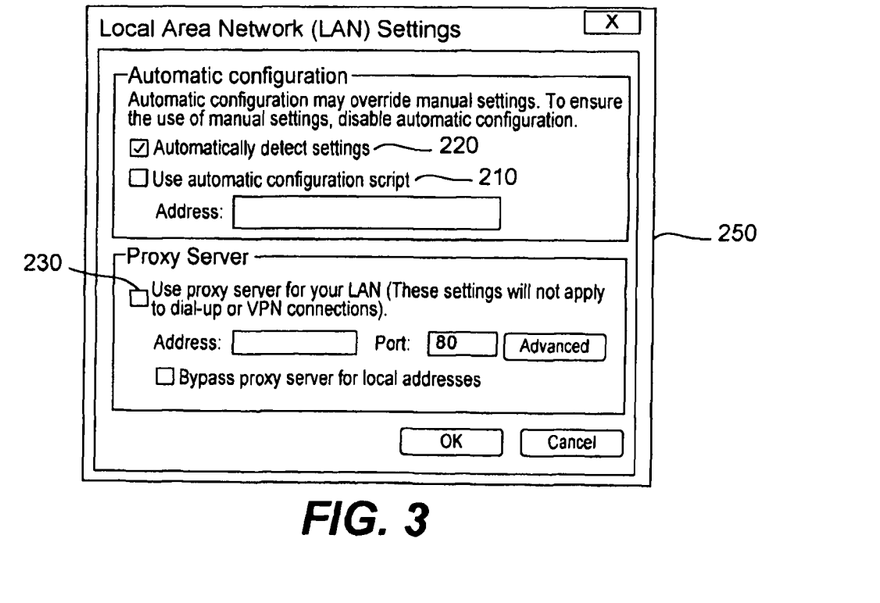
FIG. 3 illustrates an alternative embodiment of a typical settings window in a Web browser.

FIG. 3 illustrates an alternative embodiment of a typical settings window 250 in a Web browser. As is known in the art, the Web Proxy Autodiscovery Protocol (WPAD) is a commonly supported, well-known protocol that allows a browser to determine the location of the PAC file using either a DHCP-based more DNS-based lookup. As shown, setting 220 is checked indicating that the Web browser will automatically determine the location of the PAC file using WPAD. Thus, the browser would determine the location of a generic PAC file 145 on PAC server 140. In this example, organization 110 in some fashion encourages, requires or establishes that each computer user configure their browser as shown in window 250. In either case (i.e., window 200 or 250), the browser is provided the means to determine the location of the PAC file.

Figure 6:
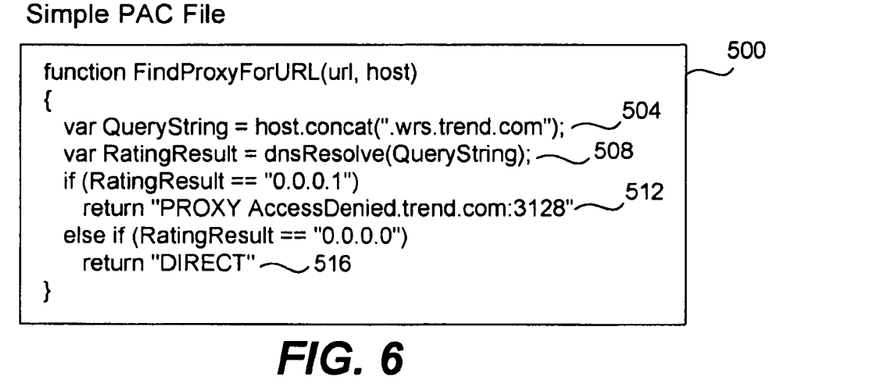
FIG. 6 is an example of the contents of a simple PAC file.

FIG. 6 is an example of the contents of a simple PAC file 500. In this simple example, the file contains a single function and the PAC file is located upon PAC server 140. The function receives as input two variables, the URL that the user is attempting to access and the host name included within that URL. The output is either a specific proxy server or an indication to access the Web site directly.

Figure 4:
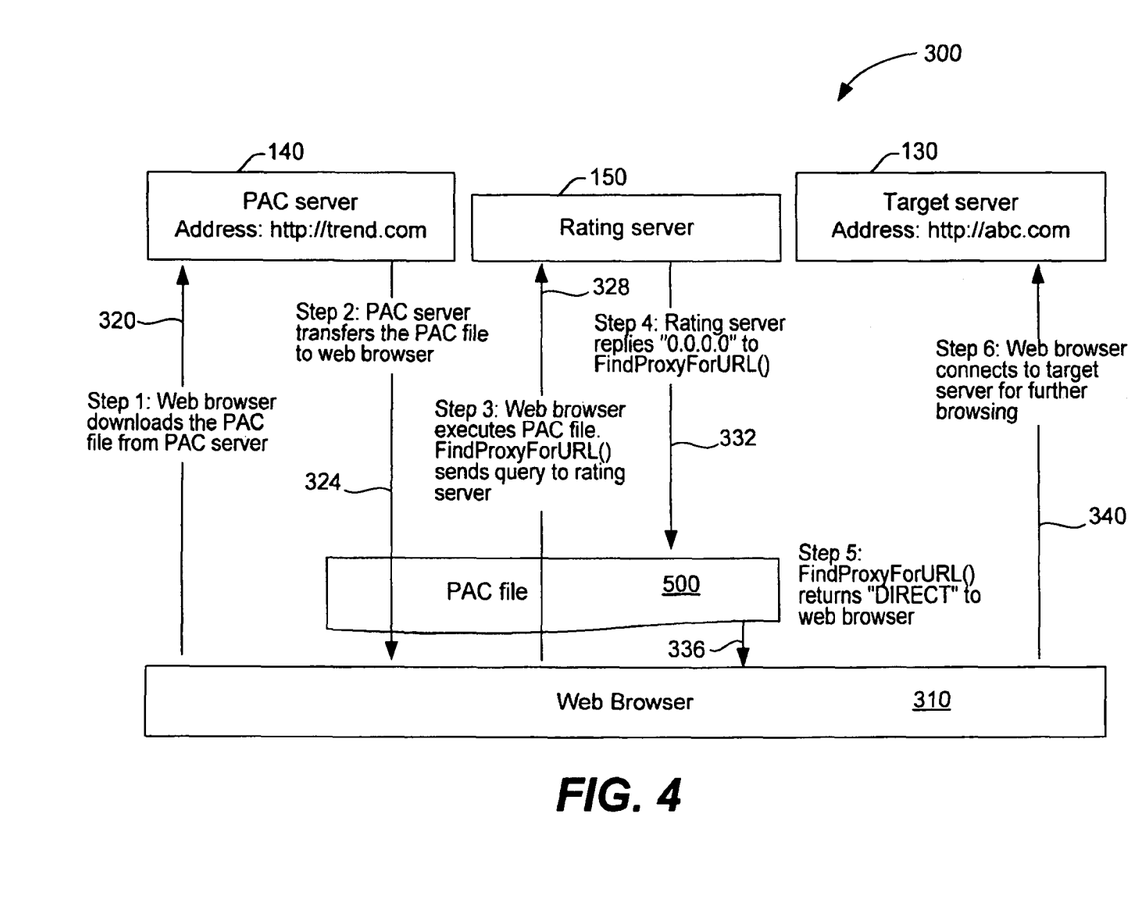
FIG. 4 is a block diagram illustrating the steps involved when the target Web site is not considered malicious.

FIG. 4 is a block diagram illustrating the steps involved when the target Web site is not considered malicious. For example, consider the user on his or her computer attempting to use Web browser 310 in order to access the site "abc.com." When the browser receives that request, it will review settings window 200 and understand that it must use the particular script found at address 212. Next, in step 320, the Web browser accesses PAC server 140 using that address and requests a download of the PAC file named in that address from the PAC server.

How the Web browser accesses server 140 in order to download the PAC file depends upon the implementation of the Web browser or agent software that sends the HPTP request. For example, some browsers (such as Microsoft's "Internet Explorer") can access many servers in different situations: an HTTP server accessed over the Internet by its IP address; an HTTP server accessed over the Internet by FQDN; an HTTP server accessed in a LAN by private a IP address; or an HTTP server accessed in a LAN described by "Computer Name." Practically speaking, most software with a configurable PAC has this ability and more. An HPTP server in a LAN accessed by a private IP address can be used in a preferred embodiment if there are security concerns.

Next, in step 324 the PAC server transfers the PAC file 500 to the Web browser in the user computer. Once the Web browser 310 receives PAC file 500, then in step 328 the Web browser begins to execute the PAC file. The function in the PAC file receives as input the URL http://abc.com and the host name "abc.com." Next, as shown in the function, a query 504 is created by concatenating the host name with the string ".wrs.trend.com." The resultant query is "abc.com.wrs.trend.com." The query is formed in this fashion so that the query will be sent to the rating server 150 which has the host name of "wrs.trend.com." The inclusion of the input host name "abc.com" in the query allows this host name to be sent to the rating server for analysis. The next step of the function, step 508 involves passing the query as input to the commonly supported utility function "DNS Resolve." As known in the art, this utility function is commonly found implemented in most computers and is available for use. The result of the use of this function is that this utility function will pass the query to the DNS server (rating server 150) in an attempt to resolve the query that has been passed to it. Of course, this utility function is unaware that the query has been specially formulated to not only access rating server 150 but to also pass the name of the target Web site "abc.com." As mentioned above, execution of the DNS Resolve function may result in a call over the Internet or may be a direct cell to a rating server located within the LAN of a corporation, with the direct call being preferable for higher security.

One way to make sure that the function "DNS Resolve" will send the query to rating server 150 is to force the request to only be resolvable by rating server 150. This avoids any caching mechanism of a third-party DNS server. For example, a fixed length of random characters may be added as the prefix of the FQDN in the request; this creates a low probability that any middle DNS server would answer it by cache. And, the probability is exponentially reduced as the length of random characters is increased linearly (defined as "negligible" in cryptography).

Once the rating server 150 receives the query of the host name "abc.com.wrs.trend.com," it takes steps to perform a rating of the target Web site as it has been programmed to do.

First, the rating server discards the suffix ".wrs.trend.com" and it is then left with the target host name of "abc.com." The rating server and then performs a Web site rating on the host name "abc.com" using any suitable Web site rating service that is implemented on the rating server. For example, the Trend Micro "URL Filtering Module" is a suitable rating service. This module is a back-end service that receives a URL and outputs a score based on various rules. The service categorizes URLs in real time (or can operate in the background) to identify and block access to inappropriate Web sites and can limit access by category, group or user, time, day and bandwidth quotas. These rules are evaluated continuously by inspecting millions of Web sites queried by users worldwide. Some of the rules include: "is there any link to a file in the Web site which is judged to be malware?", "is there a link to another Web site which is already judged as dangerous?" and, "is this URL browsed by others who are always browsing safe Web sites?" The model used by this rating service is to rank all Web sites in the world with a single high-level metric, which is a number that indicates how safe a URL is. Of course, other metrics may be used, or a combination of metrics may be output.

Depending upon the result of the rating, the rating server is then arranged to respond with a particular IP address depending upon whether the target Web site is considered dangerous or safe. Of course, the rating server may respond with any number of different IP addresses indicating varying levels of confidence in the Web site or other characteristics that one may desire to have after an analysis of the Web site. In this example, in step 332 the Web site is considered "safe" and the rating server replies with an IP address of "0.0.0.0" indicating that the Web site is safe for the user to browse. In step 516 of function 500 the function in the PAC file receives this rating result as a result of query 508 and returns a result of "DIRECT." Next, in step 336 function 500 returns the result of "DIRECT" to Web browser 310.

Once the Web browser receives this instruction from the PAC file to access the target Web site directly (rather than going through a proxy server), it then proceeds in step 340 to connect directly to the target server using the original target host name "abc.com." In this fashion, a PAC file has been arranged to allow a Web site rating service to automatically perform a rating of a Web site that a user is attempting to browse without requiring any extra action on the part of the user and without requiring any extra software on the user's computer.

In an alternative embodiment, PAC file 500 can be coded to query the rating server 150 in order to perform a Web site rating other than by using the DNS Resolve utility function. For example, the rating server 150 may be queried with a Web site host name by sending an HTTP request.

Figure 5:
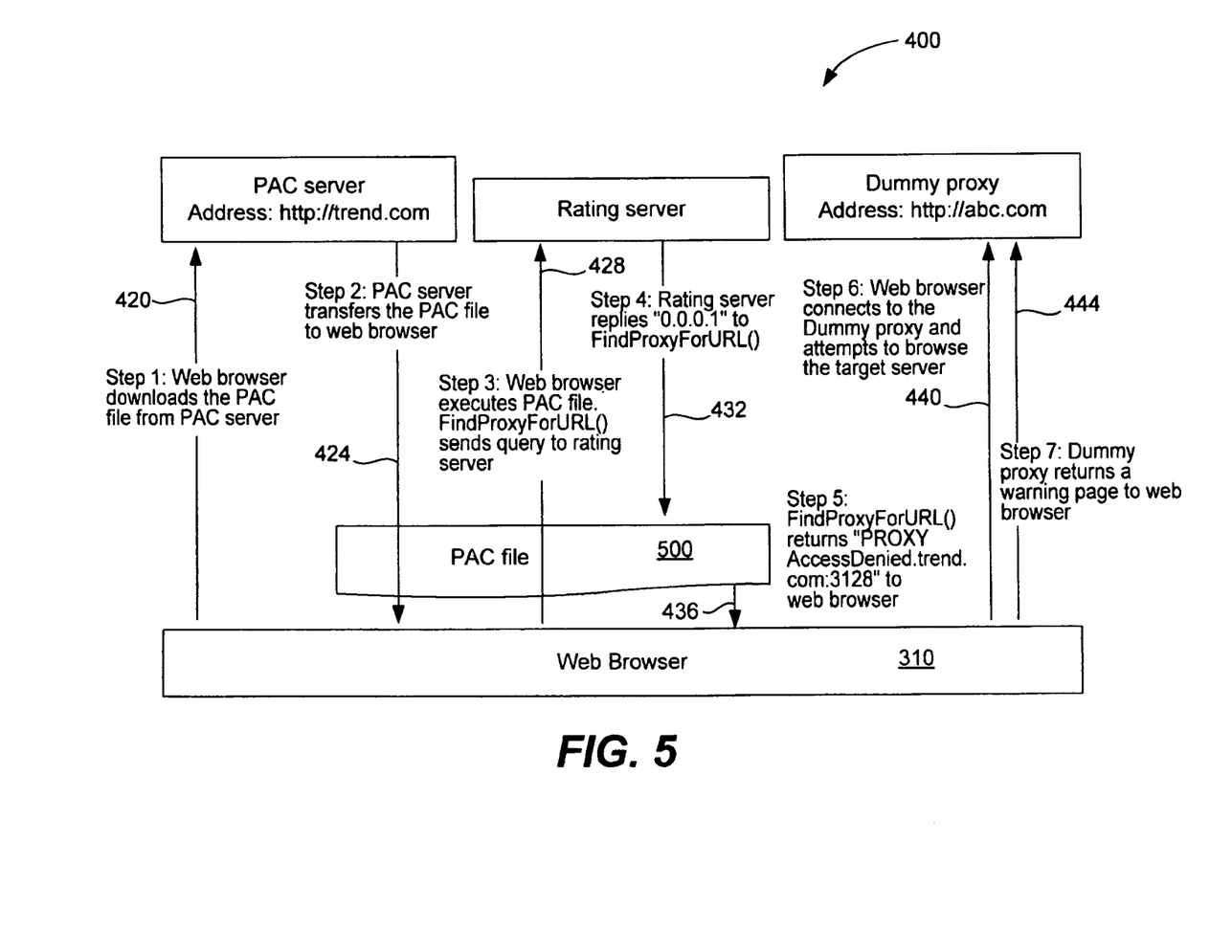
FIG. 5 is a block diagram illustrating the steps involved when the target Web site is considered malicious.

FIG. 5 is a block diagram illustrating the steps involved when the target Web site is considered malicious. For example, consider the user on his or her computer attempting to use Web browser 310 in order to access the site "abc.com." When the browser receives that request, it will review settings window 200 and understand that it must use the particular script found at address 212. Next, in step 420, the Web browser accesses PAC server 140 using that address and requests a download of the PAC file named in that address from the PAC server.

Next, in step 424 the PAC server transfers the PAC file 500 to the Web browser in the user computer. Once the Web browser 310 receives PAC file 500, then in step 428 the Web browser begins to execute the PAC file. The function in the PAC file receives as input the URL http://abc.com and the host name "abc.com." Next, as shown in the function, a query 504 is created by concatenating the host name with the string ".wrs.trend.com." The resultant query is "abc.com.wrs.trend.com." The query is formed in this fashion so that the query will be sent to the rating server 150 which has the host name of "wrs.trend.com." The inclusion of the input host name "abc.com" in the query allows this host name to be sent to the rating server for analysis. The next step of the function, step 508 involves passing the query as input to the commonly supported utility function "DNS Resolve." As known in the art, this utility function is commonly found implemented in most computers and is available for use. The result of the use of this function is that this utility function will pass the query to the DNS server (rating server 150) in an attempt to resolve the query that has been passed to it. Of course, this utility function is unaware that the query has been specially formulated to not only access rating server 150 but to also pass the name of the target Web site "abc.com."

Once the rating server 150 receives the query of the host name "abc.com.wrs.trend.com," it takes steps to perform a rating of the target Web site as it has been programmed to do. First, the rating server discards the suffix ".wrs.trend.com" and it is then left with the target host name of "abc.com." The rating server and then performs a Web site rating on the host name "abc.com" using any suitable Web site rating service as discussed above.

In this example, in step 432 the Web site is considered "dangerous" and the rating server replies with an IP address of "0.0.0.1" indicating that the Web site is not safe for the user to browse. In step 512 of function 500 the function in the PAC file receives this rating result as a result of query 508 and returns a result of "PROXY AccessDenied.trend.com:3128." Next, in step 436 function 500 returns this result to Web browser 310. This result indicates that the Web browser should use a proxy server (having a host name of "AccessDenied.trend.com") in order to access the target server, and that port 3128 should be used.

Once the Web browser receives this instruction from the PAC file to access the target Web site through a proxy server (rather than going directly), it then proceeds in step 440 to connect to the proxy server and attempt to browse the target server. Of course, using the present invention, the proxy server provided to the Web browser is not an actual proxy server that will allow access to the target Web site, it is a dummy proxy server 160 that will return a warning message. In this example, the host name of dummy proxy server 160 is "AccessDenied.trend.com" which is a proxy server hosted and implemented by organization 110. Preferably, this proxy server does not provide normal Web proxy service but always responds with a warning page to the user no matter what query is sent to it. In this fashion, the PAC file can direct a query to the dummy proxy server when a negative result is obtained from the Web rating service. In step 444 the dummy proxy server returns a warning page to the Web browser indicating that access to the target Web site is being denied. The warning page may include any information desired by organization 110. In this fashion, a PAC file has been arranged to allow a Web site rating service to automatically perform a rating of a Web site that a user is attempting to browse without requiring any extra action on the part of the user and without requiring any extra software on the user's computer.

Alternative Embodiments for PAC File

Figure 7:
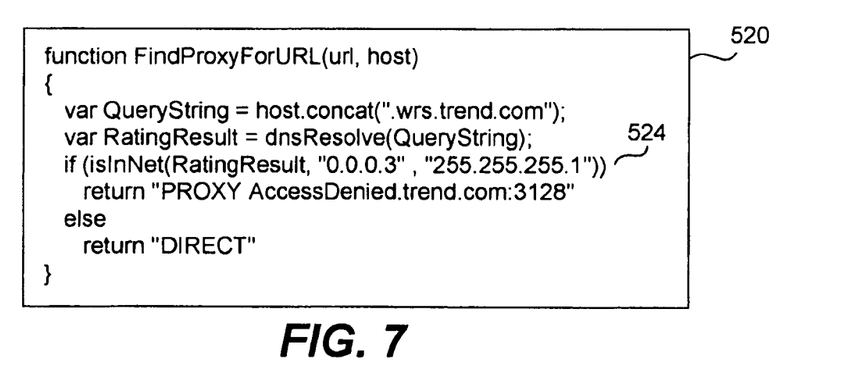
FIG. 7 is an example of an alternative PAC file for use when a security level is low.
Figure 8:
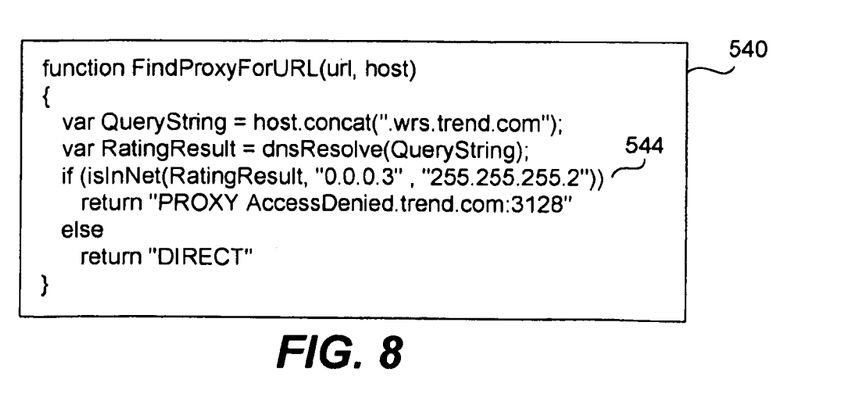
FIG. 8 is an example of an alternative PAC file for use when a security level is high.

FIG. 7 is an example of an alternative PAC file 520 for use when a security level is low. FIG. 8 is an example of an alternative PAC file 540 for use when a security level is high. Use of these PAC files can provide a selectable level of protection to the end user. Many different levels of security may be implemented in this manner.

As shown, both of these functions make use of the "isInNet" function to help determine whether access to a Web site should be allowed or denied. As known in the art, the isInNet function (host, pattern, mask) returns "true" if the host IP address matches the specified pattern. The mask indicates which part of the IP address to match (255=match, 0=ignore). Thus, depending upon the rating result returned from rating server 150, an organization can tailor a particular security level through use of one of these PAC files. In other words, the first function 520 would be used if the security level is low, while the second function 540 would be used if the security level is high. Of course, other functions may be used to provide for any number of security levels. Preferably, the Web site rating service implemented on rating server 150 is arranged to reply with one of a range of IP addresses depending upon how risky the target Web site is perceived to be.

For example, if the target Web site is considered to have no risk at all, the Web site rating service may reply with a result of "0.0.0.0" that will allow the Web site to be accessed under either security level. If the target Web site is considered to have medium risk, the Web site rating service may reply with a result of "0.0.0.2" that will allow the Web site to be accessed under low security, but denied under high security. If the target Web site is considered to have high risk, the result may be "0.0.0.3" meaning that access to the Web site will be denied no matter the security level. In this fashion, the Web site rating service may return a result characterizing any level of risk of the target Web site, or may provide any other suitable characteristic of the target Web site simply by the returning a chosen IP address that represents that level of risk or a particular characteristic. That IP address will then be interpreted by the function in the PAC file which has been written by organization 110 in order to provide a particular result depending upon any analyzed characteristic of the target Web site. In this example, either function 520 or 540 may be used on the PAC server depending upon whether the organization wishes to enforce a low security level or a high security level.

In one specific embodiment, this technique of FIGS. 7 and 8 relies upon the "isInNet" function of a browser and makes use of the following logic:

isInNet (IP_To_Judge, Subnet_Template_IP, Subnet_Mask)
If (IP_To_Judge AND Subnet_Mask) EQUALS TO (Subnet_Template_IP AND_Subnet_Mask) Then
Return TRUE
Else
Return FALSE, where "AND" means a bit-wise AND operation on the two IP addresses represented in binary form.

Thus, if the web site "http://evil.com" is judged to be moderately suspect, then access should be denied when the security level is high but allowed when the security level is low. According to the above description of the rating service replies, the DNS server should return "0.0.0.2" (deny if high security, allow if low security).

According to the logic of isInNet( ) described above, the user then may choose to use the PAC file of FIG. 8 to implement a high security level. The "if" statement in that function thus becomes: "isInNet(0.0.0.2, 0.0.0.3, 255.255.255.2)". And the result of the function should be TRUE:

isInNet ("0.0.0.2", "0.0.0.3", "255.255.255.2")
If ("0.0.0.2" AND "255.255.255.2") EQUALS TO ←"0.0.0.2" AND "255.255.255.2"="0.0.0.2"
("0.0.0.3" AND "255.255.255.2") Then ←"0.0.0.3" AND "255.255.255.2"="0.0.0.2"
Return TRUE
Else
Return FALSE.

Alternatively, the user may choose to use the PAC file of FIG. 7 to implement a low security level. The "if" statement in that function thus becomes: "isInNet(0.0.0.2, 0.0.0.3, 255.255.255.1). And the result of the function should be FALSE:

isInNet ("0.0.0.2", "0.0.0.3", "255.255.255.1")
If ("0.0.0.2" AND "255.255.255.1") EQUALS TO ←"0.0.0.2" AND "255.255.255.1"="0.0.0.0"
("0.0.0.3" AND "255.255.255.1") Then ←"0.0.0.3" AND "255.255.255.1"="0.0.0.1"
Return FALSE
Else
Return FALSE.

Figure 9:
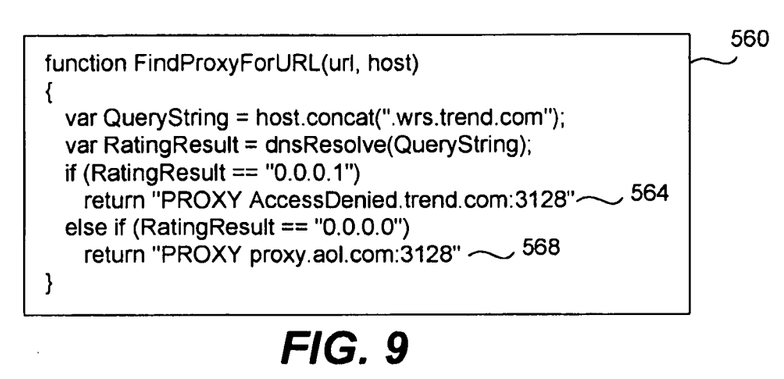
FIG. 9 is an example of an alternative PAC file for use allowing a user to access a target Web site using his or her own proxy server.

FIG. 9 is an example of an alternative PAC file 540 for use allowing a user to access a target Web site using his or her own proxy server. For example, the corporation AOL may have its own official proxy server having a host name and port such as "proxy.aol.com:3128." In this example, the user may wish to make use of the Web site rating service of the present invention yet still utilize the AOL official proxy server for communication with a target Web site. As shown, should the result be "0.0.0.1" (indicating a dangerous Web site), the browser is directed to dummy proxy server 160 as described above which provides the user with a warning message. Alternatively, should the result be "0.0.0.0" (indicating a safe Web site), then the browser is directed to the official AOL proxy server (instead of being directed to access the target Web site directly). In this fashion, any organization or entity that desires to use an official proxy server instead of allowing its users to access Web sites directly, even when those Web sites are considered safe, may do so while continuing to take advantage of the Web site rating service of the present invention.

Figure 10:
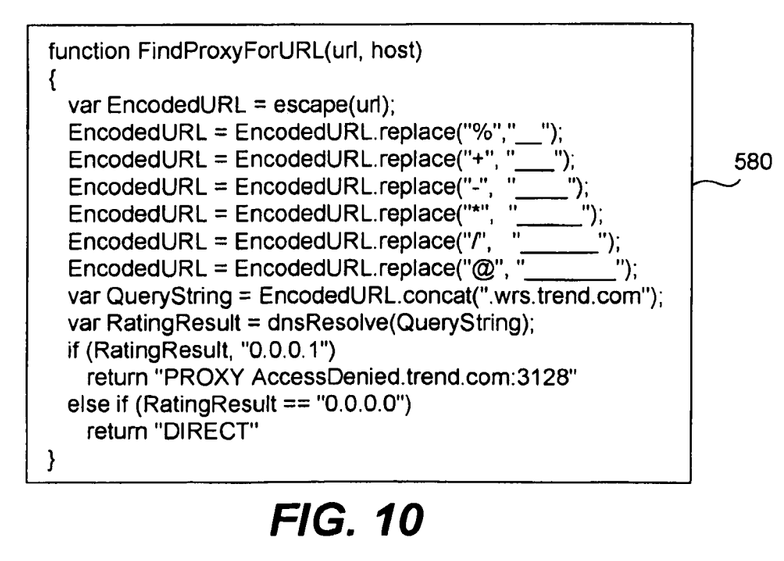
FIG. 10 is an example of an alternative PAC file allowing only a full URL to be provided.

FIG. 10 is an example of an alternative PAC file 580 allowing only a full URL to be provided. As discussed above with respect to FIG. 6, for example, typically the Web browser provides the URL and target host name to the PAC file. In this example, the Web site rating service may still perform a judgment on a Web site when only the full URL is provided to the PAC file. Function 580 shows how a PAC file may be written to decode a full URL in order to obtain the target host name and then perform a rating upon that host name. As shown, the function accurately decodes the full URL in order to produce a conforming host name that can then be processed by any intermediate DNS server without problem. The "http" and "www." that might be part of the URL may be handled in similar fashion.

In general, the basic idea is to use an encoding function to convert a URL to a valid FQDN (fully qualified domain name). FIG. 10 is a specific example of how to perform that idea; of course, other specific techniques may also be used to perform the basic idea.

Computer System Embodiment

Figure 11A:
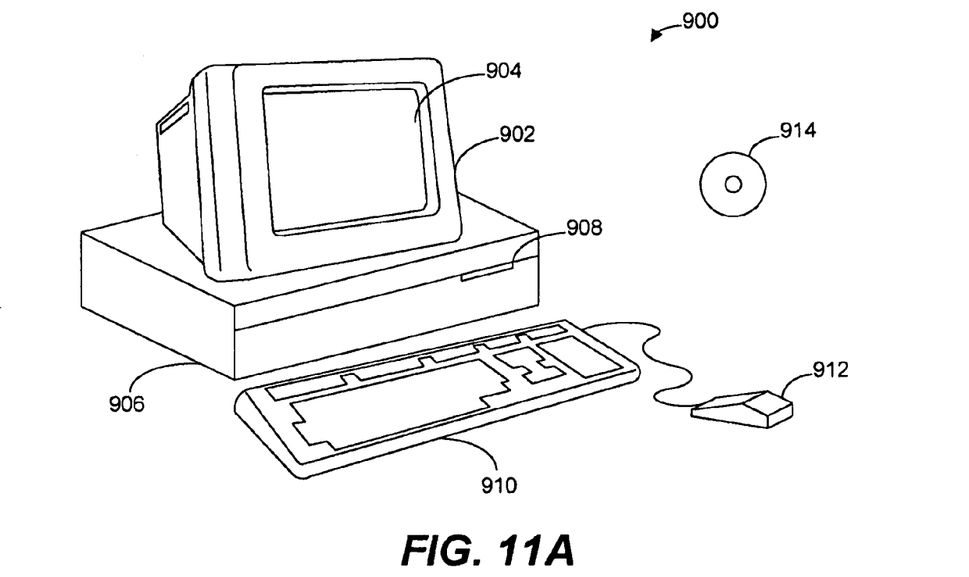
FIGS. 11A and 11B illustrate a computer system suitable for implementing embodiments of the present invention.
Figure 11B:
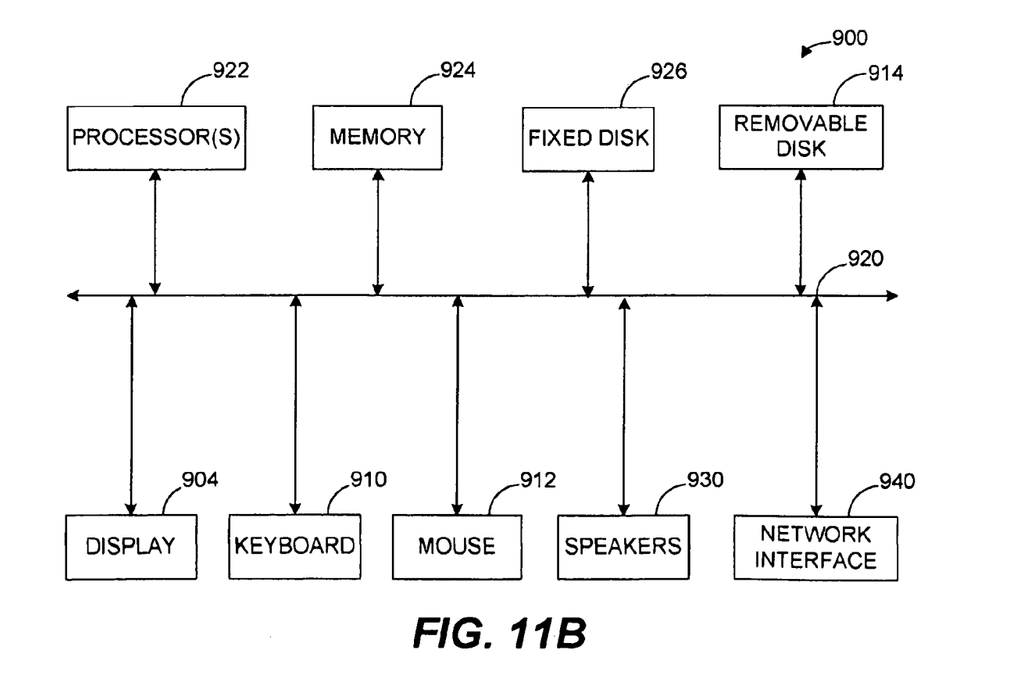

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer.

Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of rating a Web site, said method comprising:
    downloading a proxy autoconfiguration (PAC) file from a PAC server to a Web browser of a user computer;
    executing a function of said PAC file including sending a request to a rating server along with a host name of a Web site;
    producing a rating result associated with said Web site by said rating server;
    returning said rating result to said function in said PAC file;
    said function returning an address of a proxy server to said Web browser based upon said rating result from said rating server; and
    said function determining whether said rating result is positive or negative;
    said function returning an address of a dummy proxy server to said Web browser when said rating result is negative, said dummy proxy server not providing normal proxy service, not allowing access to said Web site, and always returning a warning page no matter the query sent to said dummy proxy server; and
    said function returning an address of a real proxy server to said Web browser when said rating result is positive.

2. A method as recited in claim 1 wherein said rating server includes a Web site reputation service, said method further comprising:
    analyzing said Web site by said service in order to produce said rating result, said rating result indicating a level of reputation of said Web site.

3. A method as recited in claim 1 further comprising:
    receiving a request at said Web browser to access said Web site having said host name; and
    said proxy server returning a warning message to said Web browser when said rating result is negative.

4. A method as recited in claim 1 further comprising:
    said function determining whether said rating result is positive or negative;
    said function returning an address of a proxy server to said Web browser when said rating result is negative; and
    said function returning an indication to said Web browser to access said Web site directly when said rating result is positive.

5. A method as recited in claim 1 wherein said rating result indicates a level of risk associated with said Web site.

6. A method as recited in claim 1 further comprising:
    returning said address of said proxy server based upon a combination of said rating result and a first level of security enforced by said PAC file; and
    replacing said PAC file on said PAC server with a second PAC file representing enforcement of a second level of security.

7. A method as recited in claim 1 further comprising:
    concatenating said host name with a name of said rating server to produce a query string, said host name not being located at said rating server; and
    passing said query string to a resolve function in order to send said request to said rating server.

8. A method as recited in claim 1 further comprising:
    adding a fixed length of random characters as a prefix to said host name of said request so that said request is resolved by said rating server.

9. A method as recited in claim 8 wherein said fixed length of random characters is such that the probability of a third-party DNS server answering said request is negligible, and wherein a caching mechanism of said third-party DNS server is avoided.

10. A method as recited in claim 1 wherein said rating result is produced without requiring any extra software on said user computer for executing a PAC file, other than commonly-supported software in said Web browser.

11. A method as recited in claim 1 further comprising:
passing only a URL to said function of said PAC file; and
decoding said URL to obtain said host name of said Web site.

12. A method as recited in claim 1 wherein said rating result is produced without requiring any extra software on said user computer for executing a PAC file, other than commonly-supported software in said Web browser.

13. A method of filtering Web site access, said method comprising:
receiving a request in a Web browser to access a Web site having a host name;
downloading a proxy autoconfiguration (PAC) file from a PAC server to a Web browser of a user computer;
executing a function of said PAC file, said execution causing said host name to be sent to a rating server;
performing a rating of said Web site using said host name by said rating server, said rating producing a rating result;
returning said rating result to said function of said PAC file;
based upon said rating result, said function of said PAC file returning an address of a proxy server to said Web browser; and
said function determining whether said rating result is positive or negative;
said function returning an address of a dummy proxy server to said Web browser when said rating result is negative, said dummy proxy server not providing normal proxy service, not allowing access to said Web site, and always returning a warning page no matter the query sent to said dummy proxy server; and
said function returning an address of a real proxy server to said Web browser when said rating result is positive.

14. A method as recited in claim 13 wherein said rating server includes a Web site reputation service, said method further comprising:
analyzing said Web site by said service in order to produce said rating result, said rating result indicating a level of reputation of said Web site.

15. A method as recited in claim 13 further comprising:
said function determining whether said rating result is positive or negative;
said function returning an address of a proxy server to said Web browser when said rating result is negative; and
said function returning an indication to said Web browser to access said Web site directly when said rating result is positive.

16. A method as recited in claim 13 wherein said rating result indicates a level of risk associated with said Web site.

17. A method as recited in claim 13 further comprising:
returning said address of said proxy server based upon a combination of said rating result and a first level of security enforced by said PAC file; and
replacing said PAC file on said PAC server with a second PAC file representing enforcement of a second level of security.

18. A method as recited in claim 13 further comprising:
passing a URL including said host name to said function of said PAC file without passing said host name as a separate variable;
processing said URL by said function to determine said host name; and
sending said request to said rating server with said host name after said URL has been processed.

19. A method as recited in claim 13, said executing said function further comprising:
concatenating said host name with a name of said rating server to produce a query string, said host name not being located at said rating server; and
passing said query string to a resolve function in order to cause said host name to be to sent to said rating server.

20. A method as recited in claim 13 further comprising:
adding a fixed length of random characters as a prefix to said host name of a request from said function that includes said host name so that said request is resolved by said rating server.

21. A method as recited in claim 20 wherein said fixed length of random characters is such that the probability of a third-party DNS server answering said request is negligible, and wherein a caching mechanism of said third-party DNS server is avoided.

22. A method as recited in claim 13 further comprising:
passing only a URL to said function of said PAC file; and
decoding said URL to obtain said host name of said Web site.

23. A Web site reputation system comprising:
a user computer including a Web browser;
a rating server hosting a Web site reputation service, said service producing a rating result based upon an input host name of a Web site;
a dummy proxy server arranged to return a warning page to said Web browser, wherein said dummy proxy server may only return said warning page no matter the query sent to said dummy proxy server, rather than providing normal proxy service, and not allowing access to said Web site;
a proxy autoconfiguration (PAC) server accessible by said user computer;
a PAC file resident on said PAC server including a function, said function arranged to input said host name, pass said host name to said rating server, receive said rating result, and return a proxy server to said Web browser based on said rating result.

24. A Web site reputation system as recited in claim 23 wherein said user computer, said rating server, said dummy proxy server, and said PAC server or under the control of a single organization.

25. A Web site reputation system as recited in claim 21 wherein said function being further arranged to return said proxy server based upon a combination of said rating result and a first level of security enforced by said PAC file, said system further comprising:
a second PAC file resident on said PAC server representing enforcement of a second level of security.

26. A Web site reputation system as recited in claim 23 wherein said Web browser of said user computer includes a setting by which a location of said PAC file is determined automatically, is determined using a given address, or is determined manually.

27. A Web site reputation system as recited in claim 23 wherein said Web site reputation service of said rating server is arranged to analyze the risk to said user computer of accessing said Web site.

28. A system as recited in claim 23 wherein said function being further arranged to:
- concatenate said host name with a name of said rating server to produce a query string, said host name not being located at said rating server; and
- pass said query string to a resolve function in order to pass said host name to said rating server.

29. A system as recited in claim 23 wherein said function being further arranged to:
- add a fixed length of random characters as a prefix to said host name of a request that includes said host name so that said request is resolved by said rating server.

30. A system as recited in claim 29 wherein said fixed length of random characters is such that the probability of a third-party DNS server answering said request is negligible, and wherein a caching mechanism of said third-party DNS server is avoided.

31. A system as recited in claim 23 wherein said rating result is produced without requiring any extra software on said user computer for executing a PAC file, other than commonly-supported software in said Web browser.

32. A system as recited in claim 23 wherein said function being further arranged to:
- receive only a URL; and
- decode said URL to obtain said host name of said Web site.

* * * * *

UNITED STATES PATENT AND TRADEMARK OFFICE
CERTIFICATE OF CORRECTION

PATENT NO. : 8,527,631 B1
APPLICATION NO. : 12/146899
DATED : September 3, 2013
INVENTOR(S) : Han-Chang Liang Page 1 of 1

It is certified that error appears in the above-identified patent and that said Letters Patent is hereby corrected as shown below:

In the Claims:

Column 14, Line 51 (claim 25):   change "claim 21" to --claim 23--

Signed and Sealed this
Twenty-fifth Day of March, 2014

Michelle K. Lee
*Deputy Director of the United States Patent and Trademark Office*